US012565718B2

(12) United States Patent
Zhao et al.

(10) Patent No.: US 12,565,718 B2
(45) Date of Patent: Mar. 3, 2026

(54) POLYURETHANE NANOFIBER WATERPROOF MOISTURE-PERMEABLE FILM, PREPARATION METHOD THEREOF AND APPLICATION THEREOF

(71) Applicant: JIAXING SIBAITE NANOFIBER TECHNOLOGY CO., LTD, Jiaxing (CN)

(72) Inventors: Xinglei Zhao, Shanghai (CN); Yong Jin, Zhuhai (CN); Pan Jiang, Huanggang (CN); Ting Hua, Wuhan (CN); Peng Wang, Shanghai (CN)

(73) Assignee: JIAXING SIBAITE NANOFIBER TECHNOLOGY CO., LTD, Jiaxing (CN)

( * ) Notice: Subject to any disclaimer, the term of this patent is extended or adjusted under 35 U.S.C. 154(b) by 178 days.

(21) Appl. No.: 18/534,634

(22) Filed: Dec. 10, 2023

(65) Prior Publication Data

US 2024/0158957 A1 May 16, 2024

Related U.S. Application Data

(63) Continuation of application No. PCT/CN2023/112527, filed on Aug. 11, 2023.

(30) Foreign Application Priority Data

Sep. 13, 2022 (CN) ......................... 202211108048.5

(51) Int. Cl.

| | |
|---|---|
| ***C08G 18/12*** | (2006.01) |
| ***C08G 18/08*** | (2006.01) |
| ***C08G 18/18*** | (2006.01) |
| ***C08G 18/48*** | (2006.01) |
| ***C08G 18/72*** | (2006.01) |
| ***C08G 18/76*** | (2006.01) |
| ***D01D 1/02*** | (2006.01) |
| ***D01D 5/00*** | (2006.01) |
| ***D01F 6/70*** | (2006.01) |

(52) U.S. Cl.

CPC ........... *D01F 6/70* (2013.01); *C08G 18/0852* (2013.01); *C08G 18/1825* (2013.01); *C08G 18/4804* (2013.01); *C08G 18/4808* (2013.01); *C08G 18/4812* (2013.01); *C08G 18/4825* (2013.01); *C08G 18/4829* (2013.01); *C08G 18/4833* (2013.01); *C08G 18/721* (2013.01); *C08G 18/7614* (2013.01); *C08G 18/7657* (2013.01); *C08G 18/7664* (2013.01); *C08G 18/7671* (2013.01); *C08G 18/7685* (2013.01); *D01D 5/0053* (2013.01); *D10B 2331/10* (2013.01)

(58) Field of Classification Search

CPC ................ C08G 18/0852; C08G 18/12; C08G 18/1825; C08G 18/4804; C08G 18/4808; C08G 18/4812; C08G 18/4825; C08G 18/4829; C08G 18/4833; C08G 18/721; C08G 18/7614; C08G 18/7657; C08G 18/7664; C08G 18/7671; C08G 18/7685; D01D 1/02; D01D 5/0038; D01F 6/70; D10B 2331/10

USPC ................... 264/331.19, 464, 465, 466, 484; 524/590, 871, 872, 874, 875; 528/48, 52, 528/53, 65, 67, 74

See application file for complete search history.

(56) References Cited

U.S. PATENT DOCUMENTS

| | | | |
|---|---|---|---|
| 2007/0149749 | A1 | 6/2007 | Rukavina et al. |
| 2007/0248827 | A1 | 10/2007 | Rukavina et al. |
| 2016/0024340 | A1 | 1/2016 | Rukavina |
| 2021/0155764 | A1 | 5/2021 | Martens et al. |

FOREIGN PATENT DOCUMENTS

| | | | |
|---|---|---|---|
| CN | 104356345 | A | 2/2015 |
| CN | 105164175 | A | 12/2015 |
| CN | 115434073 | | 12/2022 |
| EP | 0272682 | A | 6/1988 |
| EP | 2004717 | A | 12/2008 |

OTHER PUBLICATIONS

ISR of PCT/CN2023/112527, (mailed on Apr. 24, 2023).

*Primary Examiner* — Leo B Tentoni

(74) *Attorney, Agent, or Firm* — Hemisphere Law, PLLC

(57) ABSTRACT

The present invention provides a polyurethane nanofiber waterproof moisture-permeable film, a preparation method thereof and application thereof. The polyurethane nanofiber waterproof moisture-permeable film is prepared from two kinds of isothiocyanate and two kinds of polyethylene glycol as raw materials, and the polyurethane nanofiber waterproof moisture-permeable film has good water pressure resistance, tensile property, and moisture permeability. In addition, the polyurethane nanofiber waterproof moisture-permeable film is prepared by adopting an electrostatic spinning method, is low in cost, simple to operate and high in production efficiency, and has a good application prospect in the fields of clothing, medical treatment, electronic appliances, and the like.

13 Claims, 1 Drawing Sheet

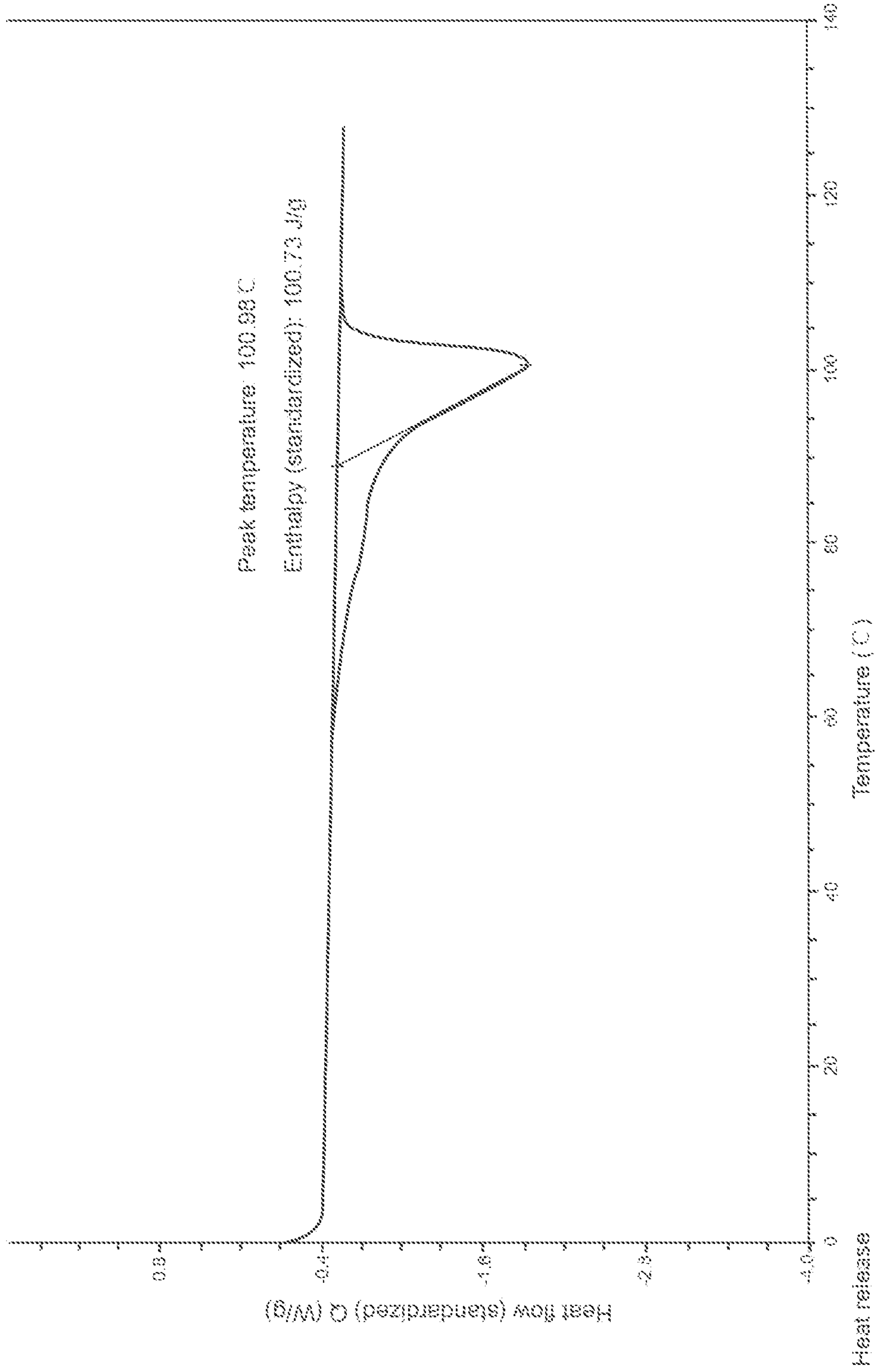
Peak temperature: 100.98 C
Enthalpy (standardized): 100.73 J/g
Temperature ( C)
Heat flow (standardized) Q (W/g)
Heat release
0
20
40
60
80
100
120
140
0.8
-0.4
-1.6
-2.8
-4.0

POLYURETHANE NANOFIBER WATERPROOF MOISTURE-PERMEABLE FILM, PREPARATION METHOD THEREOF AND APPLICATION THEREOF

CROSS REFERENCE TO RELATED APPLICATIONS

The present disclosure claims the priority to the Chinese patent application with the filing No. 2022111080485, entitled "POLYURETHANE NANOFIBER WATERPROOF MOISTURE-PERMEABLE FILM, PREPARATION METHOD THEREOF AND APPLICATION THEREOF" and filed on Sep. 13, 2022 with the Chinese Patent Office, the contents of which are incorporated herein by reference in their entirety.

TECHNICAL FIELD

The present invention relates to the field of waterproof moisture-permeable film materials, and in particular, to a polyurethane nanofiber waterproof moisture-permeable film, a preparation method thereof and an application thereof.

BACKGROUND

Waterproof moisture-permeable fabric is a kind of functional fabric, and is, because of a capability in preventing penetration of liquid water droplets and allowing water vapor to pass through, is widely used in protective coatings of functional clothing like outdoor clothing, medical operation gowns, firefighter uniforms, and space suits, film distillation, medical supplies and buildings. Based on a preparation method of the waterproof moisture-permeable fabric, the waterproof moisture-permeable fabric may be classified into three types: high-density fabrics, coating fabrics and laminated fabrics. The high-density fabrics have good moisture permeability, but poor waterproofness, the coating fabrics have good waterproofness, but poor moisture permeability, and the laminated fabrics have a good waterproof moisture-permeable function due to a waterproof moisture-permeable functional film thereof. As a key part of the laminated fabrics, the waterproof moisture-permeable film can effectively adjust a pore diameter and a structure of the film, to prevent penetration of liquid water and allow water vapor to pass through.

Electrospinning is a new type of fiber preparation technology. Its principle is to use a potential difference between a droplet at a tip of a spinneret and a collection device to realize electrospinning: The droplet gradually becomes conical under a action of a voltage, and is called as a "Taylor cone". When a surface tension of the droplet is less than a charge repulsive force on the surface, a solution on the surface of the Taylor cone ejects jet flow at a higher speed, a solvent in nanofiber may be volatilized and solidified in an elongation and bending process of the jet flow. This process is electrospinning. A micro fiber/nanofiber film prepared through electrospinning has advantages of a small pore diameter, a high pore ratio, and a large specific surface area, and has been widely used in air filtration, oil-water separation, personal safety equipment, and various sensors. Electrospinning has also been considered as an effective method for preparing a waterproof moisture-permeable film.

So far, many kinds of polymers have been used in the preparation of waterproof moisture-permeable films. Polyurethane has become a major substitute for natural rubber in sportswear and textile industries due to its high durability and excellent elasticity. There are two main types of polyurethane waterproof moisture-permeable films: microporous waterproof moisture-permeable films and dense waterproof moisture-permeable films. The microporous waterproof moisture-permeable film is distributed with a large number of micropores on a surface, and the micropores can prevent water droplets from passing through, and allow water molecules to pass through in a form of a single molecule, to realize a waterproof moisture-permeable function. The dense waterproof moisture-permeable film is constituted by hydrophilic polymers, and is moisture-permeable as water vapor passes through the film through physical interactions such as adsorption-diffusion-desorption through interaction with a hydrophilic group. The micropore film, because of its better waterproofness and moisture permeability, has a higher market share than the dense film. The polyurethane waterproof moisture-permeable film, as a preferred material in the fields of clothing, medical treatment, electronic appliances, and the like, has been researched by many researchers.

Patent CN107556715B discloses a waterproof moisture-permeable film and a preparation method thereof. Biomass materials, which are from the nature, are selected as raw materials, and belong to renewable resources, so that dependence on non-renewable petrochemical resources is reduced. In addition, the selected polyurethane raw material has better biodegradability. The present invention has a specific degree of innovation in terms of environmental protection, but the waterproof moisture-permeable film prepared by the method has a small pore size, and consequently, moisture-permeable performance needs to be further improved, and relevant performance can only meet requirements of ordinary clothing. A specification with a patent application number of 201910606694.6 discloses a preparation method of a waterproof moisture-permeable nanofiber composite film. In the preparation method, polyacrylonitrile, polyvinylidene fluoride, and polyurethane are added into N, N-dimethylformamide, and polydimethylsiloxane, and modified nano silica are added into a polymer solution, to obtain a spinning solution by using an ultrasonic technology; and a nanofiber film is obtained by using an electrospinning device. However, mechanical properties and water pressure resistance of the nanofiber film have not been effectively improved.

Therefore, it is necessary to provide a polyurethane waterproof moisture-permeable film with good moisture permeability, water pressure resistance and mechanical properties, to better meet the needs of production and practical application.

SUMMARY

To resolve the problems in the conventional technology, the present invention aims to provide a polyurethane waterproof moisture-permeable film with good moisture permeability, water pressure resistance and mechanical properties.

To achieve the objective, the present invention adopts the following technical solution.

The present invention provides a polyurethane nanofiber waterproof moisture-permeable film. The polyurethane nanofiber waterproof moisture-permeable film is prepared from the following raw materials: isothiocyanate I with a functionality of 2, isothiocyanate II with a functionality of 3, polyethylene glycol I with a functionality of 2, and polyethylene glycol II with a functionality of 3.

In some implementation solutions of the prevent invention, the isothiocyanate I has the following structure:

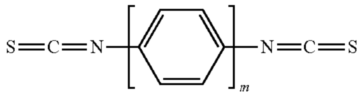

Herein, m is a positive integer of 1 to 3.

In some implementation solutions of the prevent invention, the isothiocyanate II has the following structure:

II-1

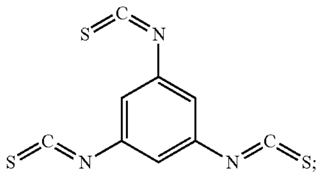

or

II-2

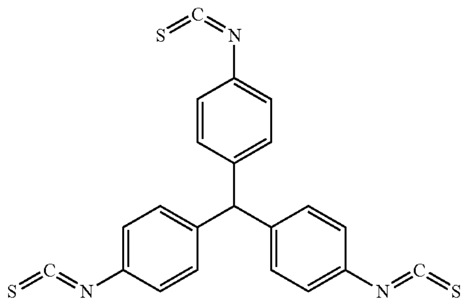

or

II-3

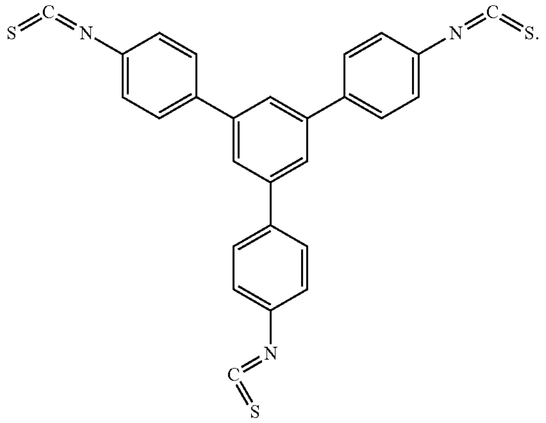

In some implementation solutions of the present invention, optionally, the functionality of the polyethylene glycol I is 2 (for example, the polyethylene glycol may be PEG 400, PEG 800, PEG 1000, PEG 2000, PEG 4000, PEG 6000, PEG 8000 or PEG 10000).

In some implementation solutions of the prevent invention, optionally, the polyethylene glycol II with the functionality of 3 has the following structure:

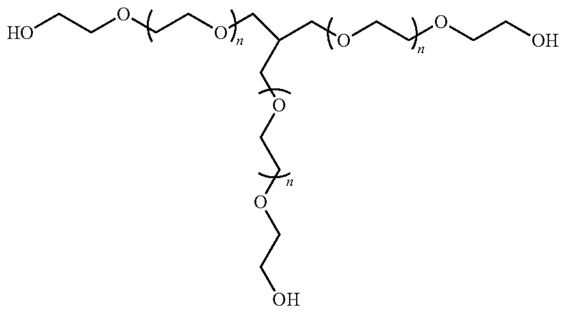

Herein, n is an integer of 6 to 12.

Further, a preparation method of the polyurethane nanofiber waterproof moisture-permeable film includes the following steps:

(1) mixing isothiocyanate I, isothiocyanate II, polyethylene glycol I, and polyethylene glycol II, to dissolve in a solvent;

(2) adding a catalyst, heating up to perform reflux reaction, and collecting a product after the reaction ends; and (3) performing electrospinning on the product to prepare the polyurethane nanofiber waterproof moisture-permeable film.

In the preparation method of the polyurethane nanofiber waterproof moisture-permeable film in the prevent invention, optionally, a molar ratio of the isothiocyanate I, isothiocyanate II, polyethylene glycol I, and polyethylene glycol II is (8-16) to (1-1.5) to (8.4-24) to (1.05 to 3) (for example, may be 8 to 1 to 8.4 to 1.05, 9 to 1 to 9.45 to 1.18, 10 to 1 to 13 to 1.3, 11 to 1 to 15.4 to 1.4, 12 to 1 to 14.4 to 1.03, 8 to 1.5 to 8.4 to 1.05, 9 to 1.5 to 9.45 to 1.18, 10 to 1.5 to 13 to 1.3, 11 to 1.5 to 15.4 to 1.4, 12 to 1.5 to 14.4 to 1.03, or any value). The solvent in step (1) is selected from any one or a mixture of tetrahydrofuran, N, N-dimethylformamide, toluene or dimethyl sulfoxide, and usage of the solvent is sum of mass of the four raw materials.

Optionally, the catalyst in step (2) is any one or a mixture of N, N-dimethylethanolamine, trimethylamine, triethylamine, dimethylethanolamine or N-methylmorpholine; usage of the solvent is 0.02-0.03% (for example, may be, 0.02%, 0.022%, 0.024%, 0.026%, 0.028%, 0.03% or any value) of total mass of a reaction system; and a reaction temperature may be 45-55° C. (for example, may be 45° C., 46° C., 47° C., 48° C., 49° C., 50° C., 51° C., 52° C., 53° C., 54° C., 55° C. or any value).

Optionally, electrospinning conditions in step (3) are as follows: A voltage is 10-90 kV (for example, may be, 10 kV, 20 kV, 30 kV, 40 kV, 50 kV, 60 kV, 70 kV, 80 kV, 90 kV, or any value), a receiving distance is 10-50 cm (for example, may be, 10 cm, 15 cm, 20 cm, 25 cm, 30 cm, 35 cm, 40 cm, 45 cm, 50 cm, or any value), a liquid supply velocity is 0.1-10 mL/h (for example, may be 0.1 mL/h, 0.2 mL/h, 0.3 mL/h, 0.4 mL/h, 0.5 mL/h, 0.6 mL/h, 0.7 mL/h, 0.8 mL/h, 0.9 mL/h, 1 mL/h, 2 mL/h, 3 mL/h, 4 mL/h, 5 mL/h, 6 mL/h, 7 mL/h, 8 mL/h, 9 mL/h, 10 mL/h, or any value), a temperature of an spinning environment is 20-35° C. (for example, may be, 20° C., 21° C., 22° C., 23° C., 24° C., 25° C., 26° C., 27° C., 28° C., 29° C., 30° C., 31° C., 32° C., 33° C., 34° C., 35° C., or any value), and a relative humidity is 50-95% (for example, may be, 50%, 55%, 60%, 65%, 70%, 75%, 80%, 85%, 90%, 95%, or any value).

The isothiocyanate I and isothiocyanate II in the present invention may be prepared by the following preparation method:

(1) adding aromatic amine substances, triethylene diamine and carbon disulfide into a solvent for reaction, and filtering to obtain a light yellow solid after the reaction ends;
(2) adding the product obtained in step (1) and triphosgene into the solvent for reaction; and
(3) filtering and purifying after the reaction ends, to obtain a product, namely the isothiocyanate.

For example, 4,4'-diisothiocyanate biphenyl in the present invention may be prepared from 4, 4'-diaminodiphenyl through the reaction.

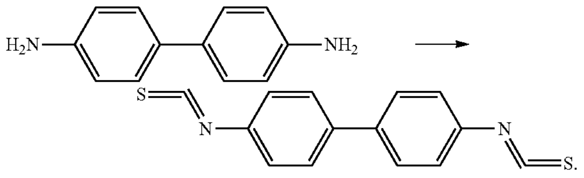

Optionally, benzocyclic diamine is any one of p-phenylenediamine, p-phenyldimethylamine, 2,4-diaminotoluene, 2, 6-diaminotoluene, 4,4'-diaminodiphenyl, diaminodiphenyl or 4, 4'-diaminodiphenylmethane.

Optionally, the aromatic triamine monomer is any one of the following structural substance:

Compound 1

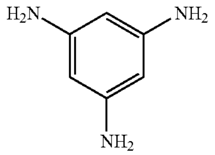

Compound 2

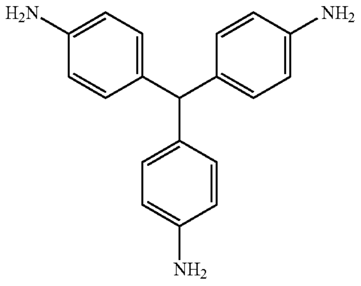

Compound 3

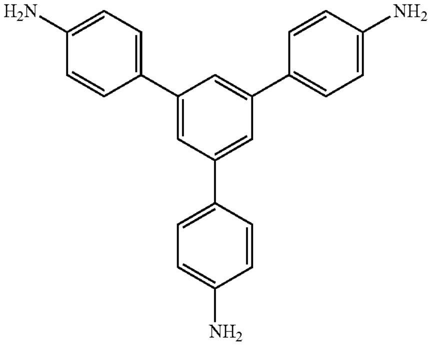

Optionally, the solvent in the step (1) is tetrahydrofuran or dimethyl sulfoxide; a molar ratio of benzocyclic diamine, triethylene diamine and tellurium disulfide is 1 to (5-9) to (7-9) (for example, may be 1 to 5 to 7, 1 to 5 to 8, 1 to 5 to 9, 1 to 6 to 7, 1 to 6 to 8, 1 to 6 to 9, 1 to 7 to 7, 1 to 7 to 8, 1 to 7 to 9, or any value); the reaction temperature is 23 to 28° C. (for example, may be, 23° C., 24° C., 25° C., 26° C., 27° C., 28° C. or any value); and reaction time is 2-3 h (for example, may be 2 h, 2.5 h, 3 h or any value).

Optionally, the solvent in the step (2) is any one of tetrahydrofuran, tetrachloromethane, or dimethyl sulfoxide; a molar weight of triphosgene is (1-1.1) (for example, may be 1, 1.05, 2 or any value) times of triethylene diamine; the reaction temperature is 23 to 28° C. (for example, may be, 23° C., 24° C., 25° C., 26° C., 27° C., 28° C. or any value); and reaction time is 2-3 h (for example, may be 2 h, 2.5 h, 3 h or any value).

Compared with the conventional technology, the present invention has the following beneficial effects:

(1) The polyurethane nanofiber waterproof moisture-permeable film provided in the present invention has good water pressure resistance and good tensile resistance.
(2) The polyurethane nanofiber waterproof moisture-permeable film provided in the present invention is prepared using isothiocyanate as a raw material. The biphenyl structure contained in isothiocyanate can show a liquid crystal state at a specific temperature. There are more micropore structures, an atomic radius of S is larger, and there are larger pore diameters in the structure, so that a gas transmission rate can be increased and moisture permeability is excellent.
(3) The polyurethane nanofiber waterproof moisture-permeable film provided in the present invention is prepared by adopting an electrostatic spinning method, is low in cost, simple to operate and high in production efficiency, and has a good application prospect in the fields of clothing, medical treatment, electronic appliances, and the like.

BRIEF DESCRIPTION OF DRAWINGS

FIG. 1 is a DSC spectrum of a polyurethane nanofiber waterproof moisture-permeable film prepared in Embodiment 1.

DETAILED DESCRIPTION OF EMBODIMENTS

The present invention will be described below in combination with specific embodiments. It should be noted that the following embodiments are examples of the present invention, and are only used to illustrate the present invention, not to limit the present invention. Other combinations and various modifications within the concept of the present invention can be made without departing from the spirit or scope of the present invention.

In the following embodiments, the compounds used and related reagents can be purchased from the market. Polyethylene glycol raw materials can be purchased from Dow, Bayer, Shandong Wanhua and Bluestar Dongda.

Preparation of Isothiocyanate I-1

A preparation method includes the following steps.

(1) Add 18.2 g of diaminodiphenyl into a reactor including 600 ml of tetrahydrofuran, start stirring, add 67.2 g of triethylenediamine, maintain a temperature at 25° C., dropwise add 44.16 g of carbon disulfide slowly, slowly separate out a light yellow solid after the dropwise addition, stop reaction after 2 hours, filter to obtain a light yellow solid, and wash a filter cake 3 times with 150 ml of n-hexane.

(2) Add the filter cake obtained in step (1) into 1000 ml of tetrahydrofuran, control a temperature of the system at 5° C., dropwise add 195 g of triphosgene dissolved in tetrahydrofuran, heat up to 50° C. within 2 hours after the dropwise addition for reaction, and maintain the reaction for 2 hours.

(3) Purify the light yellow solid obtained by the reaction by many times of n-hexane beating, to obtain a product which is isothiocyanate I-1 (a yield is 62%), where an HNMR analysis result with deuterated chloroform as solvent 1 shows that δ7. 3-7.5 is a characteristic peak of hydrogen on biphenyl, and the product has a molecular weight of 270 according to an LCMS test.

I-1

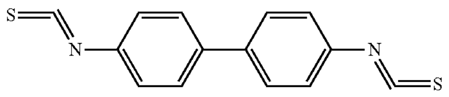

Preparation of Isothiocyanate I-2

A preparation method includes the following steps.

(1) Add 10.8 g of p-phenylenediamine into a reactor including 600 ml of tetrahydrofuran, start stirring, add 66.09 g of triethylenediamine, maintain a temperature at 25° C., dropwise add 53.3 g of carbon disulfide slowly, slowly separate out a light yellow solid after the dropwise addition, stop reaction after 2 hours, filter to obtain a light yellow solid, and wash a filter cake 3 times with 150 ml of n-hexane.

(2) Add the filter cake obtained in step (1) into 1000 ml of tetrahydrofuran, control a temperature of the system at 5° C., dropwise add 195 g of triphosgene dissolved in tetrahydrofuran, heat up to 50° C. within 2 hours after the dropwise addition for reaction, and maintain the reaction for 2 hours.

(3) Purify the light yellow solid obtained by the reaction by many times of n-hexane beating, to obtain a product which is isothiocyanate I-2 (a yield is 58%), where an HNMR analysis result with deuterated chloroform as solvent 1 shows that δ7. 3 is a characteristic peak of hydrogen on benzene, and the product has a molecular weight of 194 according to an LCMS test.

I-2

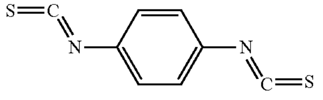

Preparation of Isothiocyanate II-1

A preparation method includes the following steps.

(1) Add 13.3 g of compound 1 into a reactor including 600 ml of tetrahydrofuran, start stirring, add 67.3 g of triethylenediamine, maintain a temperature at 25° C., dropwise add 39.74 g of carbon disulfide slowly, slowly separate out a light yellow solid after the dropwise addition, stop reaction after 2 hours, filter to obtain a light yellow solid, and wash a filter cake 3 times with 150 ml of n-hexane.

(2) Add the filter cake obtained in step (1) into 1000 ml of tetrahydrofuran, control a temperature of the system at 5° C., dropwise add 195 g of triphosgene dissolved in tetrahydrofuran, heat up to 50° C. within 2 hours after the dropwise addition for reaction, and maintain the reaction for 2 hours.

(3) Purify the light yellow solid obtained by the reaction by many times of n-hexane beating, to obtain a final product which is isothiocyanate I-1 (a yield is 53%), where an HNMR analysis result with deuterated chloroform as a solvent 1 shows that δ7. 3 is a characteristic peak of hydrogen on benzene, and the product has a molecular weight of 251 according to an LCMS test.

II-1

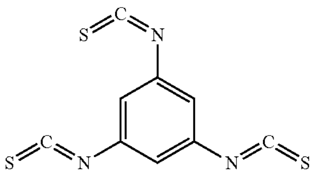

Preparation of Isothiocyanate II-2

A preparation method includes the following steps.

(1) Add 28.9 g of compound 2 into a reactor including 600 ml of tetrahydrofuran, start stirring, add 100.8 g of triethylenediamine, maintain a temperature at 25° C., dropwise add 66.24 g of carbon disulfide slowly, slowly separate out a light yellow solid after the dropwise addition, stop reaction after 2 hours, filter to obtain a light yellow solid, and wash a filter cake 3 times with 150 ml of n-hexane.

(2) Add the filter cake obtained in step (1) into 1000 ml of tetrahydrofuran, control a temperature of the system at 5° C., dropwise add 296 g of triphosgene dissolved in tetrahydrofuran, heat up to 50° C. within 2 hours after the dropwise addition for reaction, and maintain the reaction for 2 hours.

(3) Purify the light yellow solid obtained by the reaction by many times of n-hexane beating, to obtain a final product which is isothiocyanate II-2 (a yield is 49%), where an HNMR analysis result with deuterated chloroform as a solvent 1 shows that 87.1-7.2 is a characteristic peak of hydrogen on benzene, and the product has a molecular weight of 417 according to an LCMS test.

II-2

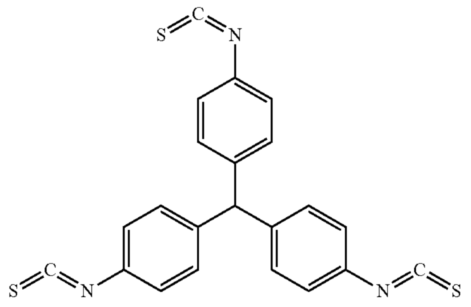

Preparation of Isothiocyanate II-3

A preparation method includes the following steps.

(1) Add 13.3 g of compound 1 into a reactor including 600 ml of tetrahydrofuran, start stirring, add 67.3 g of triethylenediamine, maintain a temperature at 25° C., dropwise add 39.74 g of carbon disulfide slowly, slowly separate out a light yellow solid after the dropwise addition, stop reaction after 2 hours, filter to obtain a light yellow solid, and wash a filter cake 3 times with 150 ml of n-hexane.

(2) Add the filter cake obtained in step (1) into 1000 ml of tetrahydrofuran, control a temperature of the system at 5° C., dropwise add 195 g of triphosgene dissolved in tetrahydrofuran, heat up to 50° C. within 2 hours after the dropwise addition for reaction, and maintain the reaction for 2 hours.

(3) Purify the light yellow solid obtained by the reaction by many times of n-hexane beating, to obtain a final product which is isothiocyanate II (a yield is 65%), where an HNMR analysis result with deuterated chloroform as a solvent 1 shows that δ7.1, δ7.5, and δ7.7 are characteristic peaks of hydrogen on benzene, and the product has a molecular weight of 479 according to an LCMS test.

II-3

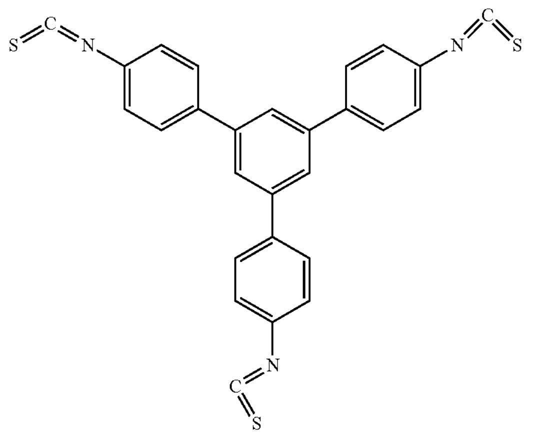

Embodiment 1

A preparation method of a polyurethane nanofiber waterproof moisture-permeable film includes the specific steps following steps.

(1) Add 4 mol of isothiocyanate I-1, 0.3 mol of isothiocyanate II-1, 4.2 mol of PEG 400, and 0.53 mol of polyethylene glycol II with a relative molecular weight of 1000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 20° C., a relative humidity is 50%, a voltage is 10 kV, a receiving distance is 10 cm, and a liquid supply speed is 0.1 mL/h.

Embodiment 2

A preparation method of a polyurethane nanofiber waterproof moisture-permeable film includes the specific steps following steps.

(1) Add 4 mol of isothiocyanate I-1, 0.29 mol of isothiocyanate II-2, 5 mol of PEG 800, and 0.56 mol of polyethylene glycol II with a relative molecular weight of 1000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 25° C., a relative humidity is 60%, a voltage is 20 kV, a receiving distance is 15 cm, and a liquid supply speed is 0.5 mL/h.

Embodiment 3

A preparation method of a polyurethane nanofiber waterproof moisture-permeable film includes the specific steps following steps.

(1) Add 4 mol of isothiocyanate I, 0.27 mol of isothiocyanate II-3, 4.4 mol of PEG 1000, and 0.55 mol of polyethylene glycol II with a relative molecular weight of 1000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 28° C., a relative humidity is 70%, a voltage is 30 kV, a receiving distance is 20 cm, and a liquid supply speed is 1 mL/h.

Embodiment 4

A preparation method of a polyurethane nanofiber waterproof moisture-permeable film includes the specific steps following steps.

(1) Add 4 mol of isothiocyanate I-2, 0.44 mol of isothiocyanate II-1, 4.8 mol of PEG 2000, and 0.53 mol of polyethylene glycol II with a relative molecular weight of 1500 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 30° C., a relative humidity is 75%, a voltage is 40 kV, a receiving distance is 25 cm, and a liquid supply speed is 2 mL/h.

Embodiment 5

A preparation method of a polyurethane nanofiber waterproof moisture-permeable film includes the specific steps following steps.

(1) Add 4 mol of isothiocyanate I-2, 0.4 mol of isothiocyanate II-2, 5.2 mol of PEG 4000, and 0.52 mol of polyethylene glycol II with a relative molecular weight of 2000 into a tetrahydrofuran solution (2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 33° C., a relative humidity is 80%, a voltage is 50 kV, a receiving distance is 30 cm, and a liquid supply speed is 3 mL/h.

Embodiment 6

A preparation method of a polyurethane nanofiber waterproof moisture-permeable film includes the specific steps following steps:

(1) Add 4 mol of isothiocyanate I-2, 0.25 mol of isothiocyanate II-3, 5.6 mol of PEG 6000, and 0.35 mol of polyethylene glycol II with a relative molecular weight of 1000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 35° C., a relative humidity is 85%, a voltage is 60 kV, a receiving distance is 35 cm, and a liquid supply speed is 4 mL/h.

Embodiment 7

A preparation method of a polyurethane nanofiber waterproof moisture-permeable film includes the specific steps following steps.

(1) Add 4 mol of isothiocyanate I-1, 0.26 mol of isothiocyanate II-2, 5.2 mol of PEG 8000, and 0.36 mol of polyethylene glycol II with a relative molecular weight of 1500 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 22° C., a relative humidity is 90%, a voltage is 70 kV, a receiving distance is 40 cm, and a liquid supply speed is 5 mL/h.

Embodiment 8

A preparation method of a polyurethane nanofiber waterproof moisture-permeable film includes the specific steps following steps:

(1) Add 4 mol of isothiocyanate I-1, 0.31 mol of isothiocyanate II-3, 4.8 mol of PEG 10000, and 0.37 mol of polyethylene glycol II with a relative molecular weight of 2000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 28° C., a relative humidity is 95%, a voltage is 80 kV, a receiving distance is 45 cm, and a liquid supply speed is 6 mL/h.

Embodiment 9

A preparation method of a polyurethane nanofiber waterproof moisture-permeable film includes the specific steps following steps.

(1) Add 4 mol of isothiocyanate I-2, 0.33 mol of isothiocyanate II-1, 4.6 mol of PEG 400, and 0.38 mol of polyethylene glycol II with a relative molecular weight of 1000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 30° C., a relative humidity is 70%, a voltage is 90 kV, a receiving distance is 50 cm, and a liquid supply speed is 8 mL/h.

Embodiment 10

A preparation method of a polyurethane nanofiber waterproof moisture-permeable film includes the specific steps following steps.

(1) Add 4 mol of isothiocyanate I-2, 0.36 mol of isothiocyanate II-2, 4.4 mol of PEG 800, and 0.4 mol of polyethylene glycol II with a relative molecular weight of 2000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 35° C., a relative humidity is 65%, a voltage is 30 kV, a receiving distance is 35 cm, and a liquid supply speed is 10 mL/h.

Comparative Example 1

A preparation method of a polyurethane nanofiber waterproof moisture-permeable film includes the specific steps following steps.

(1) Add 0.3 mol of isothiocyanate II-1, 4.2 mol of PEG 400, and 0.53 mol of polyethylene glycol II with a relative molecular weight of 1000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 20° C., a relative humidity is 50%, a voltage is 10 kV, a receiving distance is 10 cm, and a liquid supply speed is 0.1 mL/h.

Comparative Example 2

A preparation method of a polyurethane nanofiber waterproof moisture-permeable film includes the specific steps following steps.

(1) Add 4 mol of isothiocyanate I-1, 5 mol of PEG 800, and 0.56 mol of polyethylene glycol II with a relative molecular weight of 1000 into a tetrahydrofuran solution.

(2) Add 0.01 mol of N, N-dimethylethanolamine, heat up to 50° C. to perform reflux reaction, and collect a product after the reaction ends.

(3) Perform electrospinning on the product to prepare the polyurethane nanofiber waterproof moisture-permeable film, where during spinning, a temperature is controlled to 25° C., a relative humidity is 60%, a voltage is 20 kV, a receiving distance is 15 cm, and a liquid supply speed is 0.5 mL/h.

The waterproof moisture-permeable film prepared in the Embodiments and Comparative Examples is tested, and the test items included moisture permeability, water pressure resistance, tensile strength, elongation at break and differential scanning calorimetry. The moisture permeability is tested with reference to standard ASTM E96-1995 BW. The water pressure resistance is tested with reference to JIS L1092B standard. The tensile strength and elongation at break are tested with reference to standard ASTM D-412, and the results are shown in the table below.

TABLE 1

Related index test results of a waterproof and moisture-permeable film in Embodiments and Comparative Examples

| Serial number | Moisture permeability ($g/(m^2 \cdot d)$) | Water pressure resistance ($mmH_2O$) | Breaking strength (MPa) | Elongation at break (%) |
|---|---|---|---|---|
| Comparative Example 1 | 9529 | 11563 | 38.6 | 400 |
| Comparative Example 2 | 9931 | 11498 | 37.5 | 468 |
| Embodiment 1 | 17865 | 16295 | 48.6 | 765 |
| Embodiment 2 | 16547 | 15987 | 47.2 | 784 |
| Embodiment 3 | 17856 | 16234 | 48.3 | 870 |
| Embodiment 4 | 18210 | 15863 | 46.9 | 941 |
| Embodiment 5 | 14854 | 16398 | 44.5 | 912 |
| Embodiment 6 | 15210 | 16478 | 45.6 | 956 |
| Embodiment 7 | 17596 | 16385 | 48.9 | 1081 |
| Embodiment 8 | 18410 | 16888 | 48.7 | 945 |
| Embodiment 9 | 16987 | 16289 | 45.6 | 845 |
| Embodiment 10 | 17583 | 16301 | 44.1 | 811 |

It can be learned from the comparison of Comparative Example 1, Comparative Example 2 and embodiment 1, that the polyurethane waterproof moisture-permeable film in Embodiment 1 has higher moisture permeability, water pressure resistance, elongation at break and breaking strength, and has better performance. Based on the comparison of the Comparative Examples and Embodiments, it can be learned that the polyurethane nanofiber waterproof moisture-permeable film provided in the present invention has good water pressure resistance, and tensile performance. The polyurethane nanofiber waterproof moisture-permeable film provided in the present invention is prepared using isothiocyanate as a raw material. The biphenyl structure contained in isothiocyanate can show a liquid crystal state (as shown in FIG. 1) at a specific temperature. There are more micropore structures, an atomic radius of S is larger, and there are larger pore diameters in the structure, so that a gas transmission rate can be increased and moisture permeability is excellent. In addition, the polyurethane nanofiber waterproof moisture-permeable film provided in the present invention is prepared by adopting an electrostatic spinning method, is low in cost, simple to operate and high in production efficiency, and has a good application prospect in the fields of clothing, medical treatment, electronic appliances, and the like.

The above embodiments are only to illustrate the technical concepts and characteristics of the present invention, and their purpose is to let those familiar with the technology understand the content of the present invention and implement them, and cannot limit the scope of protection of the present invention. All equivalent changes or modifications shall be fall within the protection scope of the present invention.

The invention claimed is:

1. A polyurethane nanofiber waterproof moisture-permeable film, wherein the polyurethane nanofiber waterproof moisture-permeable film is prepared from the following raw materials: isothiocyanate I with a functionality of 2, isothiocyanate II with a functionality of 3, polyethylene glycol I with a functionality of 2 and polyethylene glycol II with a functionality of 3.

2. The polyurethane nanofiber waterproof moisture-permeable film according to claim 1, wherein the isothiocyanate I has the following structure:

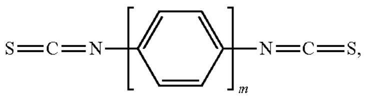

wherein m is a positive integer of 1 to 3.

3. The polyurethane nanofiber waterproof moisture-permeable film according to claim 1, wherein the isothiocyanate II has the following structure:

II-1

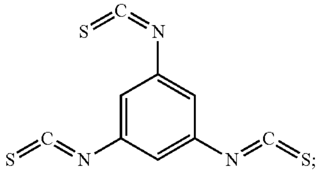

or

II-2

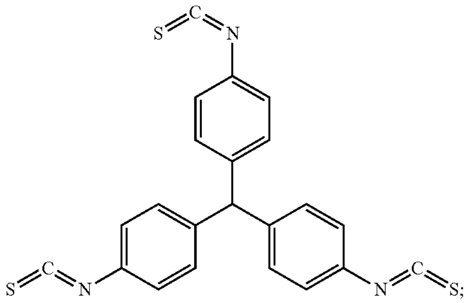

or

II-3

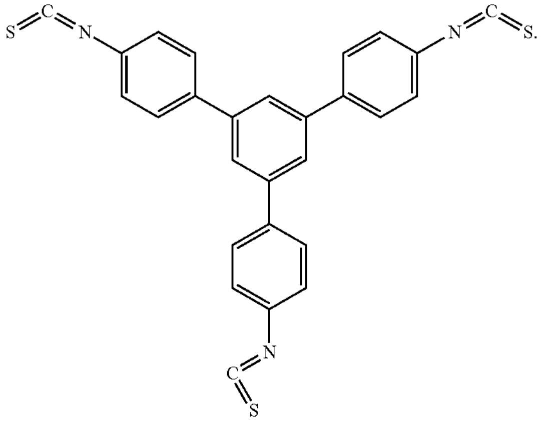

4. The polyurethane nanofiber waterproof moisture-permeable film according to claim 1, wherein the polyethylene glycol I is any one of PEG 400, PEG 800, PEG 1000, PEG 2000, PEG 4000, PEG 6000, PEG 8000 or PEG 10000.

5. The polyurethane nanofiber waterproof moisture-permeable film according to claim 1, wherein the polyethylene glycol II has the following structure:

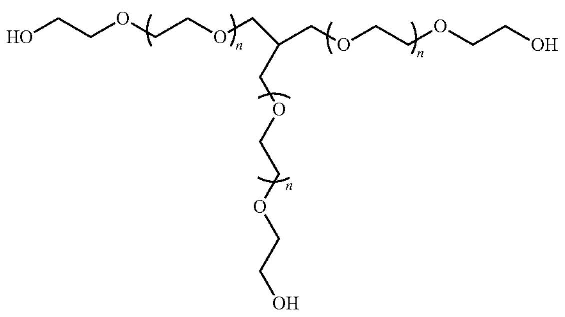

wherein n is an integer of 6 to 12.

6. A preparation method of a polyurethane nanofiber waterproof moisture-permeable film, comprising the following steps:

(1) mixing isothiocyanate I, isothiocyanate II, polyethylene glycol I, and polyethylene glycol II, to dissolve in a solvent;

(2) adding a catalyst, heating up to perform reflux reaction, and collecting a product after the reaction ends; and (3) performing electrospinning on the product to prepare the polyurethane nanofiber waterproof moisture-permeable film, wherein the polyurethane nanofiber waterproof moisture-permeable film is prepared from the following raw materials: isothiocyanate I with a functionality of 2, isothiocyanate II with a functionality of 3, polyethylene glycol I with a functionality of 2 and polyethylene glycol II with a functionality of 3.

7. The preparation method of the polyurethane nanofiber waterproof moisture-permeable film according to claim 6, wherein a molar ratio of the isothiocyanate I, isothiocyanate II, polyethylene glycol I, and polyethylene glycol II in the step (1) is (8-16) to (1-1.5) to (8.4-24) to (1.05-3); and the solvent is selected from any one or a mixture of tetrahydrofuran, N, N-dimethylformamide, toluene or dimethyl sulfoxide.

8. The preparation method of the polyurethane nanofiber waterproof moisture-permeable film according to claim 6, wherein the catalyst in step (2) is selected from any one or a mixture of N, N-dimethylethanolamine, trimethylamine, triethylamine, dimethylethanolamine or N-methylmorpholine; and a reaction temperature is 45-55° C.

9. The preparation method of the polyurethane nanofiber waterproof moisture-permeable film according to claim 6, wherein electrospinning conditions in step (3) are as follows: A voltage is 10-90 kV, a receiving distance is 10-50 cm, a liquid supply velocity is 0.1-10 mL/h, a temperature of an spinning environment is 20-35° C., and a relative humidity is 50-95%.

10. The preparation method of a polyurethane nanofiber waterproof moisture-permeable film according to claim 6, wherein the isothiocyanate I has the following structure:

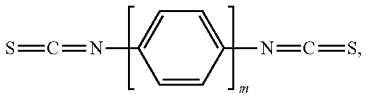

wherein m is a positive integer of 1 to 3.

11. The preparation method of a polyurethane nanofiber waterproof moisture-permeable film according to claim 6, wherein the isothiocyanate II has the following structure:

II-1

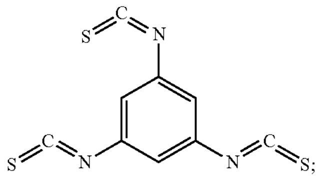

or

II-2

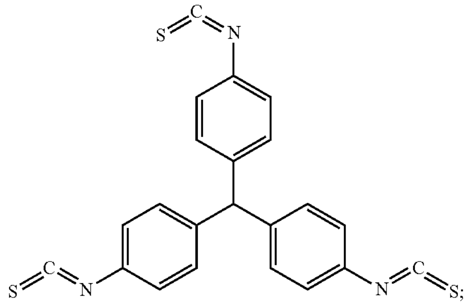

or

II-3

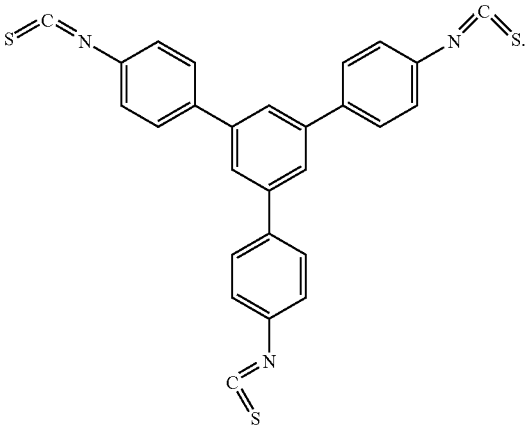

12. The preparation method of a polyurethane nanofiber waterproof moisture-permeable film according to claim 6, wherein the polyethylene glycol I is any one of PEG 400, PEG 800, PEG 1000, PEG 2000, PEG 4000, PEG 6000, PEG 8000 or PEG 10000.

13. The preparation method of a polyurethane nanofiber waterproof moisture-permeable film according to claim 6, wherein the polyethylene glycol II has the following structure:

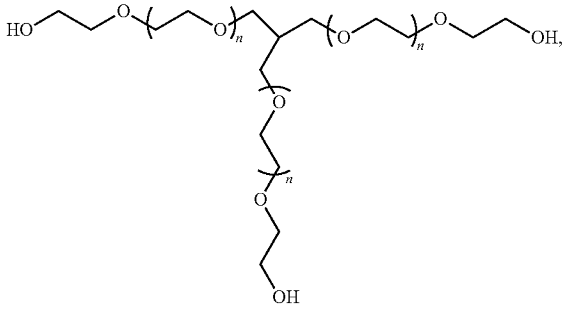

wherein n is an integer of 6 to 12.

* * * * *